(12) United States Patent
Mizuno et al.

(10) Patent No.: US 6,221,323 B1
(45) Date of Patent: Apr. 24, 2001

(54) METHOD FOR PRODUCING SUPER CLEAN AIR

(75) Inventors: Masashi Mizuno; Masuo Tada; Norio Yamazaki, all of Osaka; Takaaki Fukumoto, Tokyo, all of (JP)

(73) Assignees: Taiyo Toyo Sanso Co., Ltd., Osaka; Mitsubishi Denki Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/027,486

(22) Filed: Feb. 20, 1998

(30) Foreign Application Priority Data

Aug. 11, 1997 (JP) .................................................. 9-216834

(51) Int. Cl.$^7$ .................................................. B01D 53/00
(52) U.S. Cl. .................... 423/210; 423/220; 423/235; 423/240 R; 423/242.1; 423/245.1; 423/247; 423/248
(58) Field of Search .................... 62/600, 601, 640; 423/210, 245.1, 248, 247, 220, 235, 240 R, 242.1

(56) References Cited

U.S. PATENT DOCUMENTS 4,337,071 * 6/1982 Yang ........................................ 62/37

FOREIGN PATENT DOCUMENTS

| 0 438 282 A1 | * | 7/1991 | (EP) | ...................................... 423/247 |
| 2 177 080 | * | 1/1987 | (GB) | ...................................... 423/210 |
| 59-116109 | * | 7/1984 | (JP) | ...................................... 423/210 |
| 6-304432 | * | 11/1994 | (JP) | ...................................... 423/247 |

* cited by examiner

*Primary Examiner*—Steven P. Griffin
*Assistant Examiner*—Timothy C Vanoy
(74) *Attorney, Agent, or Firm*—Griffin & Szipl, P.C.

(57) ABSTRACT

Super clean air having therein chemical components—such as hydrocarbons, organic halogens, acidic gases, basic gases, aldehydes, nitrogen oxides, and $H_2O$ (that is, all components other than oxygen, nitrogen, and noble gases—the types of chemical components differ depending on the source of the air)—in concentrations no more than 1 ppb and a dew point lower than −40° C., is obtained from the atmosphere by low-temperature adsorption treatment in stages at temperatures ranging from −40° C. to −180° C. Material air collected from the atmosphere is pretreated in a room-temperature adsorption step to remove moisture and carbon dioxide. The pretreated air is then low-temperature adsorption treated by absorbents in a plurality of steps to adsorb the gaseous chemical components, the treatment temperature being lower in each succeeding step. Treatment at −40° C. may remove, for example, HF, $SO_2$, and/or $NH_3$. Treatment at −100° C. may remove, for example, $SF_6$, $C_2F_6$, $H_2S$, and/or $N_2O$. Treatment at −150° C. may remove, for example, $CF_4$, NO, $CH_4$, and/or CO. The last treatment step produces super clean air suitable for use in processing semiconductor wafers.

17 Claims, 4 Drawing Sheets

METHOD FOR PRODUCING SUPER CLEAN AIR

FIELD OF THE INVENTION

The present invention relates to a method for producing super clean air from atmospheric air. Chemical components such as hydrocarbons, organic halogens, acidic gases, basic gases, aldehydes, nitrogen oxides, etc. are removed to leave super clean air comprising nitrogen, oxygen, and noble gases contained in the atmosphere air. The super clean air may be used in the manufacture of semiconductors and in industrial and medical fields where prevention of contamination caused by chemical components in the atmosphere is essential.

BACKGROUND OF THE INVENTION

To prevent contamination of wafers and generation of a natural oxide film, the process of producing semiconductors is generally carried out in a clean room. Depending on the ambient air quality, etc., some of the chemical components in the ambient air are removed by an activated carbon filter. The air is then introduced into the clean room by an air-conditioning system at a constant temperature, 23–25° C. for example, and a constant relative humidity, 40–50% for example.

However, advancements in the integration of semiconductors require that the manufacturing process be carried out in an atmosphere cleaner than the air provided by the prior art filter/air-conditioner system. That is, the chemical components and moisture content left in the clean room air by the system described above still constitute a contamination source hindering the production of semiconductors.

In addition to nitrogen, oxygen and noble gases (Ar, Ne, Kr, etc. belonging to group VIII of the periodic table), the prior art system leaves in the clean air diverse chemical components such as hydrocarbons, organic halogens, acidic gases, basic gases, aldehydes, nitrogen oxides, etc., and these diverse chemical components may contaminate semiconductor wafers independently or in the presence of moisture, even if their concentration is extremely small. The degree of humidity secured as described above is provided to alleviate dryness in the mouths of workers, etc., but when air having this degree of humidity is present, a natural oxide film easily forms on wafers in contact with such air. For example, when the dew point is around −90° C. (moisture content 0.1 ppm), natural oxide film is scarcely formed even after a lapse of some 100 hours, but when the dew point is around 50° C. (moisture content 1.2 vol %), a natural oxide film will form in a few minutes.

Therefore, in order to prevent this kind of wafer contamination and the generation of a natural oxide film, super clean air must be used as the air with which the wafer comes in contact. This super clean air must have chemical components and moisture content removed therefrom to the same degree as super high quality gases such as the nitrogen gas used in the semiconductor manufacturing process. Specifically, in order to prevent wafer contamination, the chemical components in the air must be removed such that the remaining chemical components do not exceed a part per billion (ppb) level, equivalent to the level of chemical components contained in super high quality gases. Also, in order to prevent the generation of a natural oxide film on the wafer, the dew point of the air must be lowered to −40° C. to −120° C. (preferably −100° C. or lower)

The requirement for super clean air causes the production costs to be extremely high as compared to clean room air adjusted and controlled by an air-conditioning system as described above because it is difficult to provide super clean air as the atmosphere for a large volume such an entire clean room. To reduce costs, a region is formed in the clean room where wafers come in contact with air (for example, the wafer transport region between processes) whose volume can be greatly reduced within a range which does not hinder semiconductor production, the region being originally designed to be of a small volume from the viewpoint of functions and applications.

To minimize the volume of super clean air required and at the same prevent as much as possible the contamination of wafers and the formation of natural oxide films during wafer transport, a tunnel type wafer transport system has been proposed. In this system the wafer transport region is formed in a tunnel with the minimum required volume for transporting wafers, and super clean air is supplied to the tunnel rather than to the entire clean room. It has also been proposed to supply super clean air to places other than the tunnel (for example, the inner space of a storage apparatus) where contact of the wafer with air is likely to permit contamination or formation of a natural oxide film. To prevent wafer contamination, etc. it has also been proposed to supply nitrogen gas to the tunnel, etc. in place of super clean air, but the use of nitrogen is not practical from the viewpoint of cost and safety to humans.

Thus, while it is possible to effectively prevent wafer contamination and the formation of natural oxide films by supplying super clean air in the form of nitrogen to the wafer transport tunnel, etc., it is preferable that the super clean air to be produced from atmospheric air so as to reduce costs, improve safety, etc. However, the chemical components in the atmosphere are diverse as described above, and because the types of chemical components contained in material air differ widely depending on where the air is collected from the atmosphere, it is extremely difficult to remove all the chemical components in the material air such that the remaining chemical components are so scarce as to stand at no more than about one ppb. Furthermore, no method has been proposed for producing super clean air efficiently and in large quantities by using atmosphere as the material from which the super clean air is derived. This has hindered the practical applications of the tunnel method to the wafer transport system, etc. described above.

SUMMARY OF THE INVENTION

An object of this invention to provide a method for efficiently producing from the atmosphere super clean air suitable for use in semiconductor manufacturing plants, etc.

An object of the invention is to provide a method of producing super clean air from material air collected from the atmosphere, the method comprising low-temperature adsorption treating the material air with an adsorbent at a treatment temperature in the range of from −40° C. to −180° C. to adsorb and remove chemical components other than nitrogen, oxygen and noble gases from the material air. The super clean air has a dew point of from −40° C. to −120° C.

A further object of the invention is to provide a method as described above wherein, prior to low-temperature adsorption treating the material air, it is pretreated to remove carbon dioxide and moisture.

Another object of the invention is to provide a method as described above wherein the low-temperature adsorption treated air is expanded and used to cool the material air to a treatment temperature.

Still another object of the invention is to provide a method as described above wherein the adsorbent selectively and preferentially adsorbs nitrogen at temperatures in the range of −40° C. to −180° C.

Yet another object of the invention is to provide a method as described above wherein the chemical components are classified into a plurality of chemical component groups, each group including chemical components having respective solidification temperatures close to each other and falling within a solidification temperature range for the group, the low-temperature adsorption treating being divided into a number of adsorption steps equal to the number of chemical component groups, the treatment temperature for each group being close to but slightly higher than an upper limit of the solidification temperature range for the group so that, by starting with an adsorption step having a highest treatment temperature and carrying out the adsorption steps at successively lower treatment temperatures until the treatment step having the lowest treatment temperature has been completed, the chemical components are adsorbed and removed group by group starting with a group having a highest solidification temperature range and ending with a group having a lowest solidification temperature range.

The method of producing super clean air according to this invention comprises adsorbing and removing chemical components, other than nitrogen, oxygen, and noble gases from material air collected from the atmosphere, the chemical components being adsorbed by low-temperature adsorption treatment with an adsorbent at temperatures as low as from −40° C. to −180° C. As used herein, the term "chemical components" means all the components (including $H_2O$) other than nitrogen, oxygen, and noble gas contained in material air, and the types of the chemical components differ in accordance with the state of the atmosphere at the place where the material air is collected. In general, the main chemical components in material air are hydrocarbons, organic halogens, acidic gases, basic gases, aldehydes, nitrogen oxides, etc. The method produces super clean air having a dew point of −40° C. to −120° C., preferably lower than −100° C., where super clean air is defined as air having chemical component concentrations of 1 ppb or less.

The chemical component analyzer used in evaluating air produced by the present method had, to my knowledge, the highest accuracy of any presently available analyzer. Since the detection limit of this analyzer was 1 ppb, it was impossible to accurately detect the chemical component concentration when it was less than 1 ppb. Consequently, "the chemical component concentration of 1 ppb or less" as used herein means, in short, that the concentration of the chemical component is below the detection limit of the analyzer, and the numerical value of 1 ppb itself has no special meaning.

In order to produce super clean air with higher quality, the chemical components are classified into a plurality of groups each including chemical components whose respective solidification temperatures are close to each other, and the low-temperature adsorption treatment process is divided into adsorption steps the number of which is equal to the number of chemical component groups. The treatment temperature for each group is set at a temperature close to, but somewhat higher than, a solidification temperature range for each chemical component group such that the chemical components are adsorbed and removed group by group, starting with the group having a highest solidification temperature range, next the group with a second highest solidification temperature range and so forth.

Synthetic zeolite (permutite) or another adsorbent which can selectively adsorb preferentially nitrogen under temperature conditions from −40° C. to −180° C. is used for the low-temperature adsorption treatment.

In order to alleviate the load on the low-temperature adsorption treatment and improve the treatment efficiency, the material air is pretreated to remove at least carbon dioxide gas and moisture content among the chemical components before undertaking low-temperature adsorption treatment. The material air is room temperature adsorption treated using as the adsorbent a mixture of activated alumina and permutite. Optionally, the room-temperature adsorption treatment may be carried out after the material air is subjected to an oxidation treatment by a noble metal catalyst such as palladium-based catalyst, etc. under heating conditions (for example, 130° C. to 150° C.).

Other objects and advantages of the invention will become evident upon consideration of the following description and the accompanying drawings.

DESCRIPTION OF PREFERRED EMBODIMENTS

Figure 1:
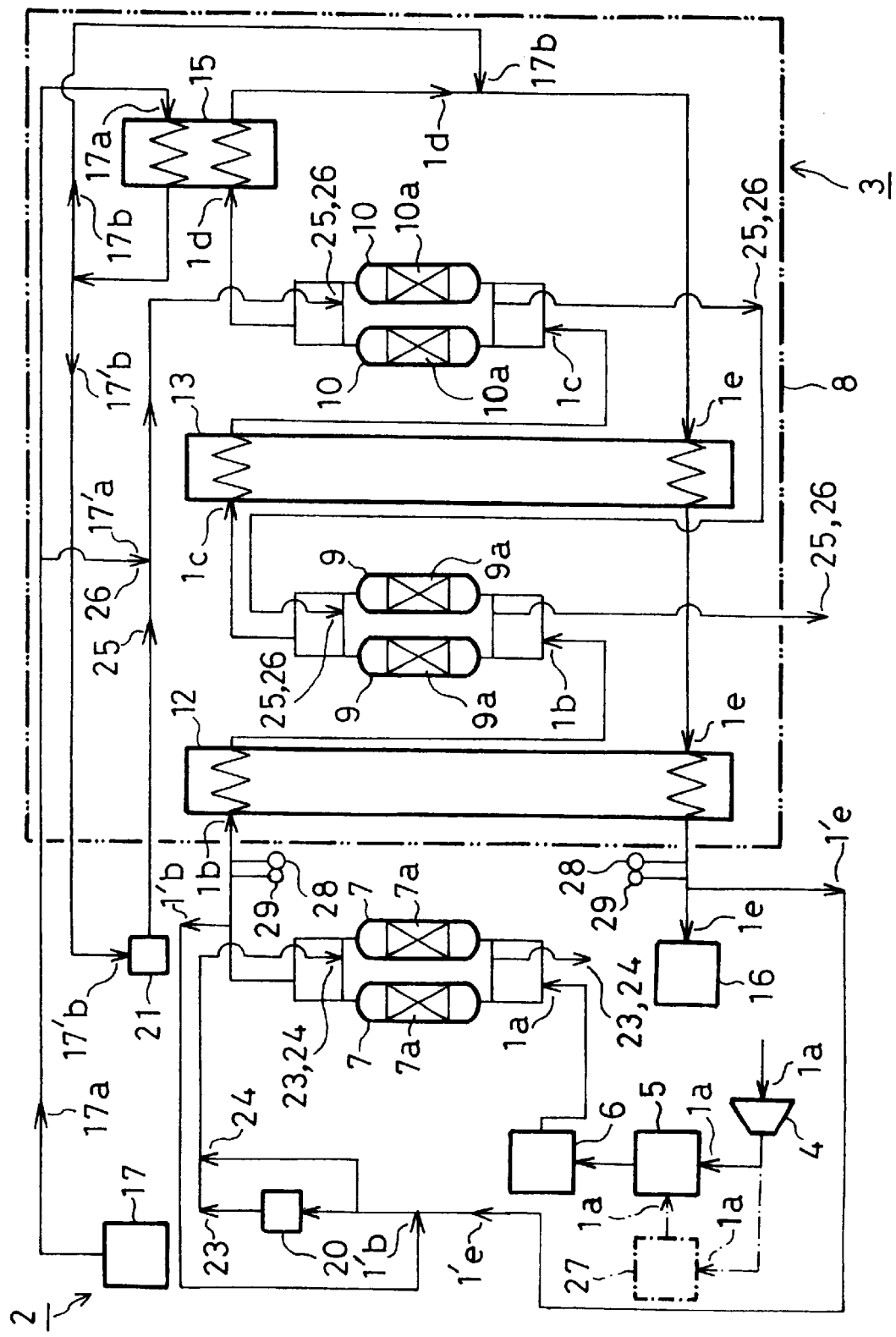
FIG. 1 illustrates a first embodiment of an apparatus for the low-temperature adsorption treatment of atmosphere in two stages to obtain super clean air.

The method for producing super clean air according to this invention comprises pretreating the material air $1a$ collected from the atmosphere by the pretreatment apparatus 2 as shown in FIG. 1 primarily to remove the moisture content and carbon dioxide gas therefrom, and then adsorption treating the pretreated air by the low-temperature adsorption treatment apparatus 3 under low-temperature conditions from −40° C. to −180° C. to obtain super clean air wherein chemical components contained in the material air $1a$, that is, components (hydrocarbon, organic halogen, acidic gas, basic gas, aldehydes, nitrogen oxides, etc.) other than nitrogen, oxygen, and noble gas (Ar, Ne, Kr, etc. that belong to the VIII group of the periodic table, etc.) are removed such that the remaining chemical components stand at a ppb level or below the 1 ppb detection limit of a chemical components analyzer 28 as discussed later and super clean air $1e$ as thus obtained has a dew point of −40° C. or less (more preferably −100° C. or less).

In the pretreatment process by the pretreatment apparatus 2, the material air $1a$ collected from the atmosphere (for example, temperature: 15–21° C.; humidity (RH): 60–80%) is pressurized and cooled, and then adsorption-treated at room temperature, thereby removing primarily the moisture content and carbon dioxide gas from the material air $1a$.

Referring to FIG. 1, material air $1a$ is fed to a compressor 4 which pressurizes it to about 1–9 $kg/cm^2$ G, preferably to about 1–3 $kg/cm^2$ G). Compressor 4 may be an oil-free reciprocating compressor, but other types of compressors may be used. The pressurized material air $1a$ is then fed to a suitable cooling means comprising an after-cooler 5 which cools the air to about 40° C. and a refrigerator 6 which further cools the air to about 5° C. to condense and separate its moisture content. The air is then fed to a room-temperature adsorption tower 7.

The room-temperature adsorption tower 7 is packed with a suitable adsorbent 7a for adsorption-treating the material air at room temperature (for example, 5° C.), and adsorbs and removes the moisture content and carbon dioxide gas to below a certain level (for example, $H_2O$: 0.01 ppm or less; $CO_2$: 0.3 ppm or less). A mixture of activated alumina and permutite may, for example, be used as the adsorbent 7a, and the amount placed in the tower is determined according to the air volume to be treated.

The room-temperature adsorption tower 7 is designed primarily to adsorb and remove $H_2O$ and $CO_2$ at room temperature (around 5° C.), but it also removes a portion of other chemical components, particularly high-boiling-point hydrocarbon systems, polar $NH_3$, NO, HCF, HF, etc. However, a portion of these components remain in the air so that the pretreated air 1b at the output of tower 7 is not super clean.

The pretreatment apparatus 2 may include means located upstream of tower 7 to alleviate the load on the low-temperature adsorption treatment later described and improve the treatment efficiency. For example, a catalyst tower 27 packed with a palladium-based or other noble metal catalyst may be provided. The compressed material air from compressor 4 is fed to catalyst tower 27 and air from the catalyst tower is then applied to cooler 5.

In the catalyst tower 7, contact of the material air 1a with the noble metal catalyst under heating conditions (preferably about 130° C. to 150° C.) oxidizes most of the chemical components such as $H_2$, CO, $CH_4$ existing in the air in very small amounts, changing these components $H_2O$ and $CO_2$. By introducing the material air 1a, oxidized in the catalyst tower 27 in this manner, into the room-temperature adsorption tower 7 through cooler 5 and refrigerator 6, chemical components such as $H_2O$, $CO_2$, $H_2$, CO, $CH_4$, etc. in the material air are effectively removed.

The pretreated material air 1b from the room temperature adsorption tower 7 is introduced into the low-temperature adsorption treatment apparatus 3 where it undergoes low-temperature treatment to remove the chemical components (for example, CO, $CO_2$, HC, $NH_3$, $Cl_2$, $NO_x$, $SO_x$, P compounds, B compounds, etc.) in the pretreated air 1b which have been so insufficiently removed by the pretreatment that the desired low concentration level (1 ppb or less) has not been reached. At the same time the dew point is lowered to −40° C. to −120° C., preferably to −100° C. or lower.

The low-temperature adsorption treatment apparatus 3 comprises first and the second low-temperature adsorption towers 9,10, first and the second heat exchangers 12, 13 and a cooling source heat exchanger 15 all disposed within a cooling enclosure 8. Adsorption towers 9,10 are packed with prescribed amounts of adsorbents 9a,10a, respectively, the amounts being determined by the amount of air to be treated.

The adsorbents 9a, 10a should exhibit a selectivity or preference for adsorbing nitrogen, as compared to oxygen, at low-temperatures in the range of −40° C. to −180° C. Permutite (preferably, with fine pores about 5 Å in diameter) is a preferred adsorbent. However, other adsorbents having an adsorption capacity for $N_2$ that is greater than that for $O_2$ at temperatures of −40° C. to −180° C. may be used. Activated alumina, activated carbon, or a mixture thereof can be used in addition to permutite.

The pretreated air 1b is permitted to flow from the room-temperature treatment adsorption tower 7 through the first heat exchanger 12 where the air is cooled to a primary low-temperature in the range of −40° C. to −60° C. The pretreated air 1b, cooled to the primary low-temperature, is then passed through the first adsorption tower 9.

In the first low-temperature adsorption tower 9, some of the chemical components contained in the air 1b are removed and the dew point is further lowered by adsorption-treating the pretreated air 1b at the primary treatment temperature so that a primary treated air 1c is available at the output of adsorption tower 9.

The primary treated air 1c passes through the second heat exchanger 13 which lowers the temperature of the air to a secondary treatment temperature in the range of −140° C. to −180° C. The cooled primary treated air 1c is then passed through the second low-temperature adsorption tower 10 where chemical components not previously removed are removed and the dew point is further lowered by adsorption-treating at the lower secondary treatment temperature.

The secondary treated air 1d at the output of adsorption tower 10 is a super clean air having concentrations of chemical components less than 1 ppb and a dew point in the desired range of −40° C. to −120° C. The air 1d is passed through heat exchanger 15 where it is further cooled, and is then mixed with nitrogen gas 17b to obtain the super clean air 1e which is supplied to an output or user apparatus 16. In this example source 17 provides liquefied nitrogen 17a which is applied to heat exchanger 15. The latent heat of vaporization of the liquefied nitrogen 17a provides a cooling source that cools the secondary treated air 1d. As heat is exchanged between the secondary treated air 1d and the liquefied nitrogen 17a in the heat exchanger, the nitrogen evaporates to provide a low-temperature nitrogen gas 17b which is then mixed with the secondary treated air 1d.

The super clean air 1e, that is, the secondary treated air 1d, after being cooled in the cooling source heat exchanger 15 and mixed with heat-exchanged nitrogen 17b, is used as the refrigerant in heat exchangers 12 and 13. As shown in FIG. 1, the air 1e passes first through heat exchanger 13 to cool the primary treated air 1c to the secondary treatment temperature, and then through heat exchanger 12 to cool the pretreatment air 1b to the primary treatment temperature. The air 1e absorbs heat in each of the heat exchangers so that it is at room temperature when it reaches user 16.

As shown in FIG. 1, each adsorption tower 7, 9, 10 actually comprises a pair of towers. The towers are designed to operate repeatedly in a specified time cycle. During each cycle first tower of each pair performs its adsorption function while adsorbent (7a, 9a, 10a) in a second tower of the pair is being regenerated and cooled, after which the second tower of each pair performs its adsorption function while the adsorbent in the first tower of the pair is regenerated and cooled.

The gas for regenerating and cooling the adsorbents in the room-temperature adsorption tower 7 may be a part 1'b of the pretreated air 1b, a part 1'e of the super clean air 1e, or a mixture of the two. For regeneration, the air or mixture of air is heated by a heater 20 and then continuously supplied, as regenerating gas 23, to tower 7 where it is applied for a specified time to the one of the adsorbents 7a currently being regenerated. Thereafter, and for a specified time, the air or mixture of air is applied to the same one of the adsorbents 7a as a cooling gas 24 which has not passed through the heater 20.

During the time one of the adsorbents 7a is being regenerated and cooled as just described, the other adsorbent 7a adsorbs moisture, carbon dioxide and a part of the chemical components from the mixture air $1a$ that is flowing to the adsorbent tower 7. The regenerating gas 23 heats the adsorbents $7a$ alternately to around 120° C. The purpose of the regenerating treatment is to desorb and release from one of the adsorbents $7a$ the moisture content and carbon dioxide gas as well as the part of the chemical components it adsorbed while other adsorbent was being regenerated and cooled. The purpose of cooling gas 24 is to cool the adsorbent towers and the adsorbents therein to the vicinity of the temperature of the adsorption treatment.

The towers 9 and 10 are cycled in the same manner as towers 7. The regenerating gas 25 for regenerating the adsorbents $9a$ and $10a$ is obtained by feeding a part $17'b$ of the heat exchanged nitrogen gas available at the output of heat exchanger 15 to a heater 21. The output of heater 21 is the regenerating gas 25 which is fed to adsorption towers 10 and from these towers to adsorption towers 9 thereby heating the desorbents $9a$ and $10a$ alternately and for specified times as described above with reference to adsorbents $7a$. This regenerating treatment desorbs and releases from the adsorbents $9a$, $10a$ the chemical components CO, $CO_2$, HC, $NH_3$, $Cl_2$, $NO_x$, $SO_x$, P compounds, B compounds, etc.) adsorbed by the adsorbents $9a$, $10a$.

A part $17'a$ of the liquefied nitrogen $17a$ available at source 17 is used as the cooling gas 26 which cools the low-temperature adsorption towers 9,10 and the adsorbents $9a$, $10a$ therein to the vicinity of their respective adsorption temperature.

Because permutite or other material which can adsorb nitrogen preferentially is used as the adsorbents $9a$, $10a$, and also because nitrogen gas is used as the regenerating gas 25 and the cooling gas 26, it is possible prevent with certainty the explosion of self-dissolving gases and inflammable gases adsorbed at low-temperature.

The lower the adsorption process temperature within the range −40° C. to −180° C., the higher is the rate of removal of the chemical components (adsorption capacity). This is because the chemical components decrease molecular kinetic energy as the temperature lowers in the temperature region in which the chemical components are not solidified but hold the gas form, and therefore the physical adsorption capacity increase. This fact indicates that it is most desirable to adsorb the chemical components at the temperature near their solidifying point in order to effectively adsorb and remove the chemical components. On the other hand, the types of chemical components contained in the atmosphere are diverse and their solidifying points are various.

Consequently, it is possible to remarkably lower the processing temperature, improve the rate of removal of chemical components, and at the same time greatly lower the dew point by classifying the chemical components into a plurality of chemical component groups each component group including chemical components whose respective solidification temperatures are close to each other, dividing the low-temperature adsorption treatment process into a number of adsorption steps equal to the number of chemical component groups, and setting the treatment temperature for each group at a temperature close to, but somewhat higher than the solidification temperature range for each chemical component group. By starting with the adsorption step having the highest treatment temperature, proceeding to the step with the second highest temperature and so forth, the chemical components may be adsorbed and removed group by group, starting with the group having the highest solidification temperature range and ending with the group having the lowest solidification temperature range.

Figure 2:
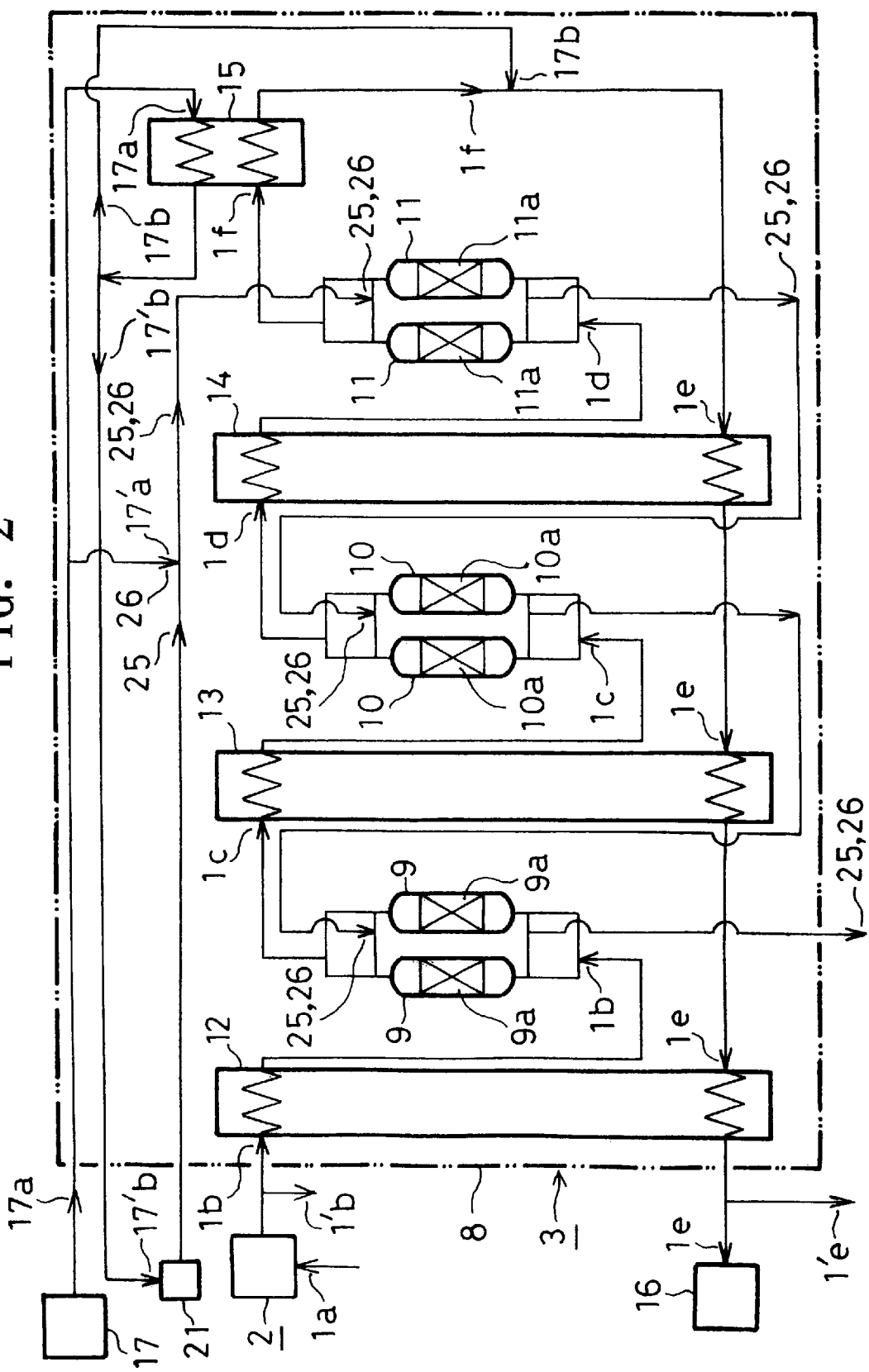
FIG. 2 illustrates an embodiment of an apparatus for the low-temperature adsorption treatment of atmosphere in three stages to obtain super clean air, the super clean air being mixed with heat exchanged nitrogen to provide cooling for adsorption process heat exchangers.

This effect becomes more evident as the number of low-temperature adsorption steps increases, but from the practical viewpoint of treatment efficiency and economy, it is enough to adsorb chemical components at two stages by first and second low-temperature adsorption towers 9, 10 as shown in FIG. 1, or at three stages by providing a third low-temperature adsorption tower 11 as shown in FIG. 2.

To provide for low-temperature adsorption in three stages, the secondary treated air $1d$ from the second stage tower 10 is further cooled in a third heat exchanger 14 before passing to the third low-temperature adsorption tower 11. This tower is filled with an adsorbent $11a$ identical to the adsorbent $10a$ as packed, and the adsorbent $11a$ is cyclically regenerated and cooled in the manner as described above with respect to adsorbents $9a$ and $10a$.

The secondary treated air $1d$ undergoes a further low-temperature adsorption treatment in the low-temperature adsorption tower 11 so that a tertiarily treated air $1f$ is obtained. The air $1f$ is passed through the cooling source heat exchanger $1f$ and then mixed with the heat-exchanged nitrogen $17b$ to produce the low-temperature super clean air $1e$.

The super clean air $1e$ is passed serially through heat exchangers 14, 13 and 12. This warms the air $1e$ before it is supplied to user 16 and also provides a cooling source in the heat exchangers for cooling the secondary treated air $1d$, primary treated air $1c$ and pretreated air $1b$. The temperatures are set such that the pretreated air $1b$ is treated at about −40° C. in adsorption tower 9, the primary treated air $1c$ is treated at about −100° C. in adsorption tower 10, and the secondary treated air $1d$ is treated at −150° C. to −180° C. in adsorption tower 11.

When the air is adsorbed over three stages in this way, the main chemical components removed in each adsorption step are, for example, HF, $SO_2$, $NH_3$, etc. in the −40° C. adsorption treatment by the first low-temperature adsorption tower 9, $SF_6$, $C_2F_6$, $H_2S$, $N_2O$, etc. in the in the −100° C. adsorption treatment by the second low-temperature adsorbent tower 10, and $CF_4$, NO, $CH_4$, CO, etc. in the −150° C. adsorption treatment by the third low-temperature adsorption tower 11. Needless to say, part of these chemical components is removed in the adsorption treatment in any of the stages. For example, the chemical components of $CF_4$, NO, $CH_4$, CO, etc. are primarily adsorbed and removed at the third low-temperature adsorption tower 11 but are also adsorbed and removed to some extent at the first and the second low-temperature adsorption towers 9 and 10.

In FIGS. 1 and 2, the low-temperature adsorption treatment of air takes place in a plurality of stages to remove all chemical components so that no chemical component is present in a concentration greater than 1 ppb in the super clean air $1e$. However, depending on the quality of super clean air required by user 16, only one stage of low-temperature adsorption treatment may be required. For example, if the type of chemical components to be removed is limited, or the chemical component removal rate is not required to be so high, and adsorption treatment at a temperature of from −40° C. to −60 C. is sufficient to remove undesirable chemical components, adsorption treatment can be carried out in the first low-temperature adsorption tower 9 only. In such case, it is possible to use an electrical or mechanical freezer as the cooling source without using liquefied nitrogen $17a$. Needless to say, when adsorption treatment is carried out only at adsorption tower 9, it is possible to lower the treatment temperature to around −150° C. However, since the adsorption capacity is lowered in the case of the chemical components with a high solidifying point as described above, and depending on the concentration of the relevant chemical components, the chemical components may solidify and clog the piping system of the heat exchanger, etc. Therefore, it is desirable to provide two or more stages for the treatment process.

In FIGS. 1 and 2, liquefied nitrogen 17a is used as the cooling source for carrying out the low-temperature adsorption treatment by the low-temperature adsorption towers. However, it is also possible to expand part of the low-temperature adsorption treated air from the process pressure to about atmospheric pressure with an expander, and use the expanded air as a cooling source for low-temperature adsorption treatment. This method greatly reduces the cooling energy as compared with the case in which liquefied nitrogen 17a is used as the cooling energy.

Figure 3:
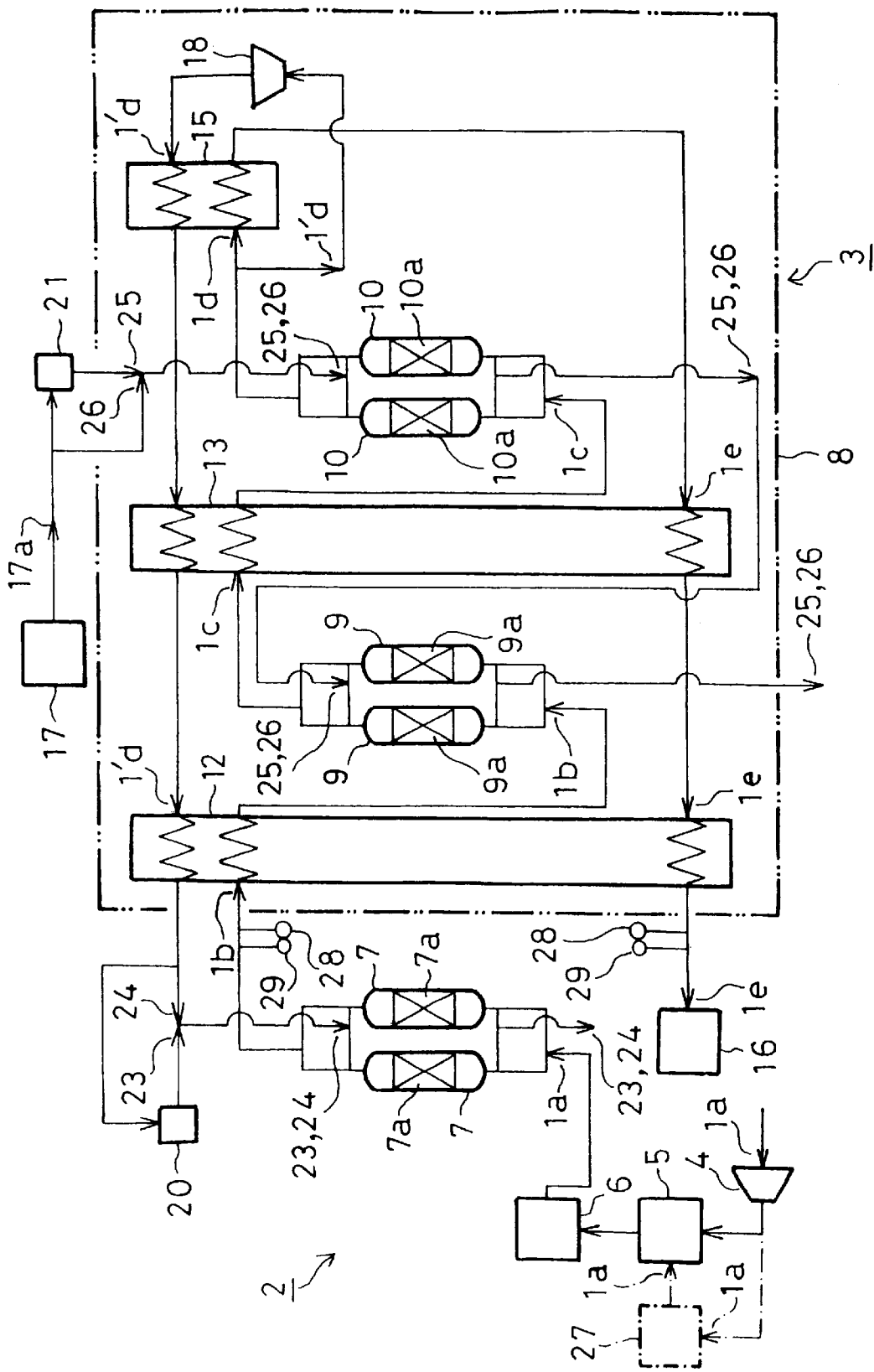
FIG. 3 shows a modification of the apparatus of FIG. 2 wherein the adsorption process heat exchangers are cooled by liquefied nitrogen that has been heat exchanged; and, FIG. 4 shows an experiment apparatus for verifying that the atmosphere may be low-temperature adsorption treated to obtain super clean air.

For example, as shown in FIG. 3, a first part 1′d of the secondary treated air 1d at the output of the second low-temperature adsorption tower 10 is expanded from process pressure to the vicinity of atmospheric pressure by an expander 18 such as an expansion turbine. The expansion lowers the temperature of the air which is then introduced into the cooling source heat exchanger 15 and allowed to pass through the second heat exchanger 13 and the first heat exchanger 12.

The part of the secondary treated air 1d that is not expanded passes directly from the second low-temperature adsorption tower 10 to the cooling source heat exchanger 15 and is thus cooled by heat exchange with the low-temperature air 1′d. This part of the secondary treated air is a super clean air 1e which is passed through heat exchangers 13 and 12 to the super clean air user 16. Consequently, the pretreated air 1b is cooled to the specified primary treatment temperature in the heat exchanger 12 by heat exchange with both the super clean air 1e and the low-temperature air 1′d while primary treated air 1c is heat exchanged with the super clean air 1e and the low-temperature air 1′d in heat exchanger 13 to cool it to the secondary treatment temperature.

In this example, the air 1′d, having been used as the cooling source and heat-recovered at the heat exchangers 12, 13 and 15, is used as both the regenerating gas 23 and the cooling gas 24 for the room-temperature adsorption tower 7. That is, after air 1′d has passed through the first heat exchanger 12 it is heated by the heater 20 and applied to tower 7 as the regenerating gas 23, and is applied to the tower as the cooling gas 24 without being heated. The gases 23 and 24 are used in tower 7 to regenerate the adsorbent 7a therein and cool the tower in the same manner as previously explained with reference to FIG. 1. However, in this case, unlike the case shown in FIG. 1, none of the pretreated air 1b and none of the super clean air 1e is used for the regeneration and cooling of tower 7. All of the pretreated air 1b is adsorption treated at low-temperature, and all of the super clean air 1e obtained at the output of heat exchanger 15 is supplied to the super clean air user 16.

The low-temperature adsorption towers 9 and 10 are regenerated and cooled by nitrogen supplied from liquid nitrogen source 17. The liquid nitrogen 17a is heated by heater 21 to provide the regenerating gas 25 and the nitrogen, without heating, is used as the cooling gas 26.

Since the construction and processing operations in FIG. 3, other than those described above, are same as those of the embodiment shown in FIG. 1, similar parts are denoted by like reference numerals and the explanation of their operation will be repeated.

Three stages are sufficient to carry out the adsorption treatment under low-temperature conditions from −40° C. to −180° C. as described above, but depending on the required quality of super clean air, it may be carried out at 4 or more stages. The treatment temperature at each stage may be optionally set in the range from −40° C. to −180° C. in accordance with the chemical components to be removed, etc.

Various configurations of the treatment apparatus are possible depending on the conditions of the atmosphere from which the material air 1a is collected or the required quality of the super clean air. For example, when the solidifying point of air 1a is lower than the temperature of the low-temperature adsorption treatment, it is possible to omit the pretreatment by the pretreatment apparatus 2 and use the material air 1a as the pretreated air 1b which is applied to the low-temperature adsorption treatment 3. If air discharged from a clean room or air discharged from a super clean air using space or apparatus is used as the material air it may be applied either to the pretreatment apparatus 2 as the material air 1a or to the low-temperature adsorption apparatus 3 as the pretreated air 1b. For example, in a tunnel type wafer transport system as mentioned above, when the super clean air in the tunnel is circulated and used, it is possible to apply the used super clean air discharged from the tunnel to the low-temperature adsorption treatment apparatus 3 as the material air (pretreated air) 1b. The super clean air may thus be used in the user apparatus 16 and the recycled through the treatment apparatus 3 or 2 and 3.

As mentioned above, the low-temperature adsorption apparatus 3 is placed inside a cooling box 8. The box may be an iron case having a heat insulating material therein or, in cases where the surrounding atmosphere will place a high thermal load on the apparatus, a vacuum heat-insulating container may be used to reduce the consumption of the cooling energy (liquefied nitrogen). The vacuum container may house the whole low-temperature adsorption apparatus 3, any one of its elements (a low-temperature adsorption tower, a heat exchanger, etc.) or a plurality of its elements (for example, one low-temperature adsorption tower and the heat exchanger for cooling air to be introduced to the adsorption tower).

Several experiments or tests were conducted to confirm that the method as described above produced super clean air. Test 1. Using the pretreatment apparatus 2 and low-temperature adsorption treatment apparatus 3 shown in FIG. 1, the room-temperature adsorption tower 7 was packed with 400 kg. of an absorbent comprising a mixture of activated alumina and permutite. Material air 1a (atmospheric at a temperature of 15–21° C., humidity (RH) of 60–80% and analyzed for chemical components) was supplied at the rate of 1000 Nm$^3$/h and pressurized to 2.0 kg/cm$^2$ G using an oil-free reciprocating compressor 4. The pressurized air was cooled first to a temperature of 40° C. with an after-cooler 5, then to 5° C. by a heat exchanging type cooler 6 using a freezer. After the moisture content was condensed and separated, it was fed to the room temperature adsorption tower 7.

The pretreated air 1b at the output of the tower was analyzed with analyzers 28 and 29 (discussed later) and found to contain: $H_2O \leqq 0.01$ ppm and $CO_2 \leqq 0.3$ ppm. Analysis also confirmed that other chemical components such as $NH_3$, NO, HCl, HF, etc. were also removed to some extent.

Next, 725 Nm$^3$/h out of the 1000 Nm$^3$/h pretreated air 1b obtained as described above was introduced to the low-temperature adsorption treatment apparatus 3 and low-temperature adsorption treated by cooling it to −60° C. in the first heat exchanger 12 and adsorption treating it at the −60° C. primary treatment temperature in the first low-temperature adsorption tower 9 to obtain a primary treated air 1c. The primary treated air was cooled to −150° C. by the second heat exchanger 13 and adsorption-treated at the −150° C secondary treatment temperature in the second low-temperature adsorption tower 10. Permutite having fine pores 5 Å in diameter was used as the adsorbents in towers 9 and 10, each tower being filled with 30 kg of adsorbent.

The secondary treated air 1d produced by tower 10 was cooled to −152° in the cooling source heat exchanger 15 by supplying liquefied nitrogen 17a to the heat exchanger at the rate of 20 Nm$^3$/h.

The secondary treated air 1d was then mixed with the heat exchanged nitrogen 17b (−152° C.) and the mixture was allowed to pass through the heat exchangers 13 and 12 where heat was recovered by cooling the pretreated air 1b and the primary treated air 1c to the above-mentioned temperatures. This raised the super clean air 1e to room-temperature.

The room-temperature adsorption towers 7 were cycled every 4 hours. That is, one tower was controlled to perform the adsorption function for 4 hours while other tower was cooled and its adsorbent regenerated, the operations of the towers then being reversed for the next four hours. Of the pretreated air 1b available at the output of one tower 7, 275 Nm$^3$/h was heated to 130° C. by the electric heater 20 and applied to the other tower 7 as the regenerating gas 23. The regenerating gas was applied for 1.5 hours, bringing the adsorbent to 120° C. Thereafter, the pretreated air was continuously supplied to the other tower 7 for a period of 2.0 hours, bringing the other tower and its adsorbent to a temperature of 8° C.

A part 17'b (5 Nm$^3$/h) of the heat-exchanged nitrogen that had passed through the cooling source heat exchanger 15 was heated to 130° C. by an electric heater 21 to obtain the regenerating gas 25. The heated gas was supplied continuously for 14 hours to the one of the towers 9 and the one of the towers 10 currently in the regeneration and cooling portion of a cycle so that the temperatures of the adsorbents therein were raised to 120° C. and the adsorbents regenerated. Thereafter, 5 Nm$^3$/h of liquefied nitrogen 17'a was supplied continuously for 8 hours as the cooling gas 26 to the tower 9 and the tower 10 that were regenerated. Because the liquefied nitrogen was passed first through a tower 10 and then through a tower 9, it cooled the tower 10 and its adsorbent 10a to −150° C. or lower while tower 9 and its adsorbent 9a were cooled to −50° C.

A chemical composition analyzer 28 (Shimadzu Inc. GC-MS, QP-300) and a moisture content analyzer 29 (Panametric SYSTEM-11 Model) were connected to the air outlet and inlet of the low-temperature adsorption apparatus 3 to detect the concentration of chemical components in, and the dew point of, the pretreated air 1b and the output or super clean air 1e. Since the chemical components in air are extremely diverse, and vary and are changeable in accordance with the atmospheric conditions under which material air is collected, it is difficult to specify and analyze all of the components. Therefore, with respect to the chemical component concentration of super clean air 1e, some chemical components ($CH_4$, $N_2O$, CO, NO, and $SO_2$, hereinafter called the "specified chemical components") which are considered to be difficult to remove by generally adapted adsorption treatment were chosen and the input or pretreated air 1b and the output air 1e were analyzed to determine the concentrations of these chemical components only.

Table 1 shows the analysis results. The concentration of each of the specified chemical components was reduced to, or below, the detection limit (1 ppb) of the chemical component analyzer 28.

TABLE I

| | CONCENTRATION | |
|---|---|---|
| | Input Air | Output Air |
| $CH_4$ | 1.8 ppm | ≦1 ppb |
| $N_2O$ | 0.07 ppm | ≦1 ppb |
| CO | 0.7 ppm | ≦1 ppb |
| NO | 0.02 ppm | ≦1 ppb |
| $SO_2$ | 0.2 ppm | ≦1 ppb |

Furthermore, the dew point (−100° C.) of the input air was lowered so that the dew point of the output air was ≦−110° C. As discussed above, the oxidation and contamination of wafers will not occur at a dew point this low.

Figure 4:
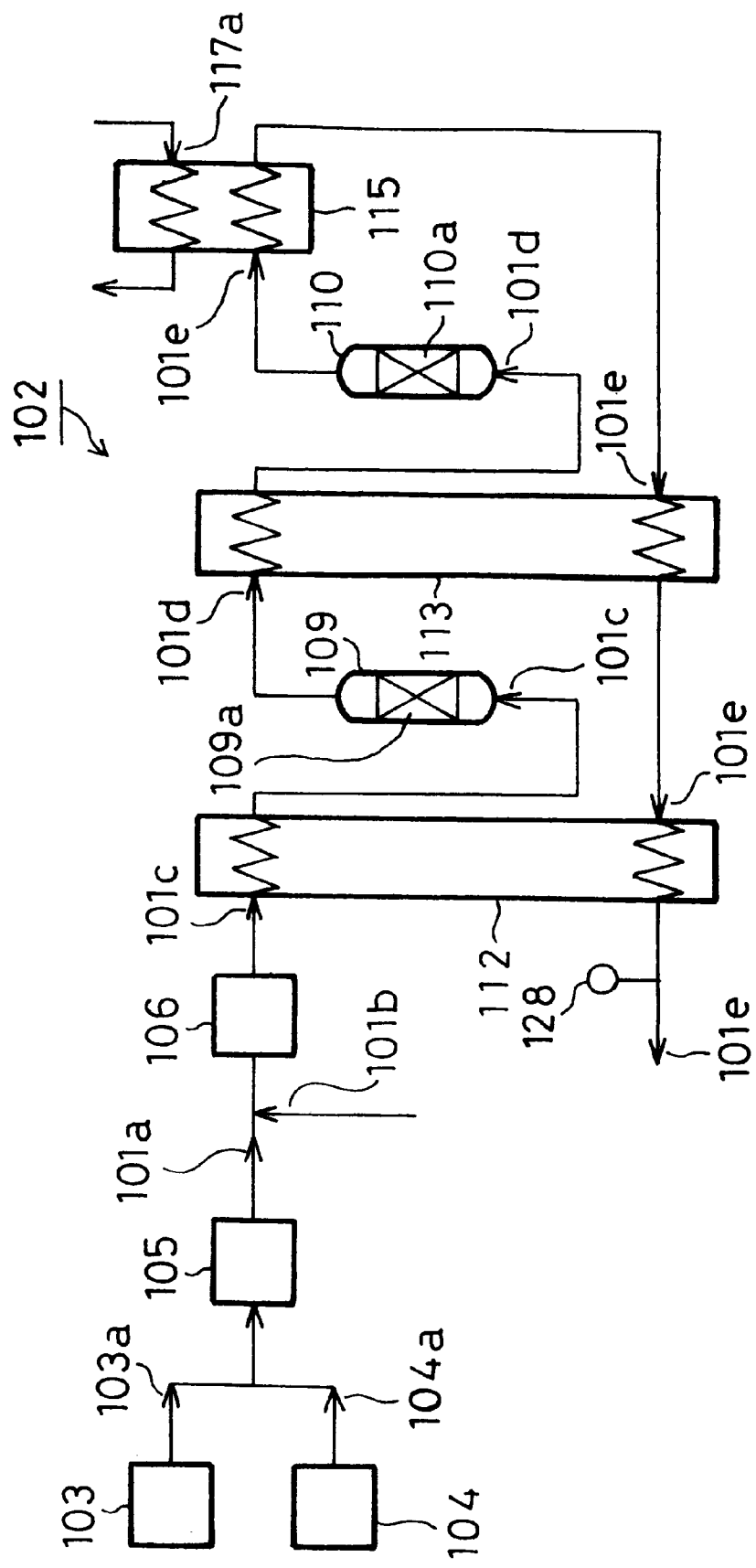

Since it is difficult to specify all the chemical components contained in material air collected from the atmosphere as mentioned above, there is no means to accurately confirm that the inventive process will yield super clean air from atmospheric air. Therefore, a further test was conducted using artificially produced air and an experimental apparatus as shown in FIG. 4. Test 2. Material oxygen 103a and material nitrogen 104a were obtained using a Taiyo Toyo Sanso Co., Ltd. Model TOP-300 high purity oxygen purifier 103 (30 Nm$^3$/hr capacity) and a Model TIP-1000 high purity nitrogen purifier 104 (capacity 100 Nm$^3$/hr) made by the same company. The nitrogen and oxygen were mixed in a mixer 105 to obtain a composite air 101a at a pressure of 2 kg/cm$^2$ G and a flow rate of 99 Nm$^3$/hr, this air having the known composition of 21% oxygen and 79% nitrogen. Table II indicates the concentration of impurity components in the nitrogen 103a, oxygen 104a and composite air 101a. The dew point was ≦−100° C. for the oxygen, the nitrogen and the composite air.

TABLE II

| | IMPURITY COMPONENT CONCENTRATIONS | | |
|---|---|---|---|
| Impurity Component | Oxygen 103a | Nitrogen 104a | Composite Air 101a |
| CO | <3 ppb | <1 ppb | <2 ppb |
| $CO_2$ | <1 ppb | <1 ppb | <1 ppt |
| $H_2$ | <1 ppb | <1 ppb | <1 ppb |
| $NO_x$ | <1 ppb | <1 ppb | <1 ppb |
| $SO_x$ | <1 ppb | <1 ppb | <1 ppb |
| $NH_3$ | <1 ppb | <1 ppb | <1 ppb |
| $Cl_2$ | <1 ppb | <1 ppb | <1 ppb |
| THC (total hydrocarbon) | <1 ppb | <1 ppb | <1 ppb |

Table II

The composite gas 101a was then mixed with an $N_2$ based gas 101b in a mixer 106, the $N_2$ based gas being supplied at a rate of 1 Nm$^3$/hr. The $N_2$ based gas was prepared to have predetermined concentrations of chemical components, hereafter referred to as the "added chemical components", the concentrations being: 100 ppm CO; 100 ppm $CO_2$; 100 ppm $CH_4$; 50 ppm $SO_2$; 100 ppm NO; 10 ppm $NH_3$ and 10 ppm $Cl_2$. An artificial air 101c was thus obtained at the rate of 100 Nm$^3$/hr, the artificial air having therein added chemical components in known concentrations.

Prior to beginning adsorption treatment, the system of FIG. 4 was brought to operating temperatures by flowing composite air 101a only, that is, without being mixed with gas 101b, sequentially through a first heat exchanger 112, a first low-temperature adsorption tower 109, a second heat exchanger 113, a second low-temperature adsorption tower 110 and a cooling source heat exchanger 115. The heat exchanger 115 was supplied with liquefied nitrogen 117a so that the composite air 101e at the output of tower 110a was cooled by heat exchange. The heat exchanged air 101e was then passed through the second heat exchanger 113 and then the first heat exchanger 112 to cool them to their respective operating temperatures.

After the system had been brought to its operating temperatures, the artificial air 101c (mixture of composite air 101a and gas 101b) was allowed to flow through the system and was cooled to −60° C. in the first heat exchanger for adsorption treatment at this temperature in tower 109, and cooled to −150° C. in the second heat exchanger for adsorption treatment at this temperature in the tower 110. Adsorbents 109a and 110a each comprised 10 kg of permutite having fine pores 5 Å in diameter.

The two stage low-temperature adsorption treatment produced super clean air 101e which was used during the adsorption treatment to cool heat exchangers 113 and 112. A Shimadzu GC-MS, QP-300 chemical component analyzer 128 (identical to the analyzer 28) was installed at the exit side of the heat exchanger 112 to detect the concentrations of the added chemical components in the air 101e. Detection was made 12 hours after the start of the low-temperature adsorption treatment and the results are tabulated in Table III.

Thereafter, the material nitrogen 104a was heated to 120° C. and supplied continuously for 5 hours to the adsorption towers to regenerate the adsorbents therein. After regeneration, the adsorbents were then cooled by applying composite air 101a as described above. After the regeneration and cooling, low-temperature adsorption was again carried out and the air 101e again detected by analyzer 128. This analysis produced the same results as shown in Table III.

TABLE III

| Added Chemical Component | CONCENTRATIONS | |
| --- | --- | --- |
|  | Air 101c | Air 101e |
| CO | 100 ppm | ≦1 ppb |
| $CO_2$ | 100 ppm | ≦1 ppb |
| $CH_4$ | 100 ppm | ≦1 ppb |
| NO | 100 ppm | ≦1 ppb |
| $SO_2$ | 50 ppm | ≦1 ppb |
| $NH_3$ | 10 ppm | ≦1 ppb |
| $Cl_2$ | 10 ppm | ≦1 ppb |

From Table II it is clear that chemical components in the atmosphere can be reduced to the order of one part per billion or less (the detection limit of the chemical component analyzer being 1 ppb) by low-temperature adsorption treatment of the atmosphere. The chemical components in the atmosphere vary depending upon the place where the air is collected but, in general, these components conform to what is described in "Chemistry of the Atmosphere (General Information on Chemistry No. 10)" edited by the Japan Chemical Association. The artificial air used in Test 2 included added chemical components in concentrations of from 2 to 10 times the concentrations set forth in this publication, these added chemical components including in general those most difficult to remove by adsorption treatment. Therefore, based on the results obtained by Test 2 it is reasonable to assert that super clean air may be obtained by low-temperature adsorption treatment of naturally occurring atmospheric air.

Test 3. A third test was conducted using the pretreatment apparatus 2 and low-temperature adsorption treatment apparatus shown in FIG. 3. The adsorbent in tower 7 comprised 3,600 kg of a mixture of permutite and activated alumina and the adsorbents 9a and 10a in each of the towers 9 and 10 comprised 250 kg of permutite having fine pores 5 Å in diameter.

10,000 $Nm^3$/hr of material air 1a (temperature 15–21° C.; humidity (RH) 60–80%) was collected from the atmosphere and pressurized to 2.0 $kg/cm^2$ G by the oil-free reciprocating compressor 4. It was then cooled to 40° C. by after cooler 5 and further cooled to 5° C. by freezer 6 to condense and separate the moisture content. The remaining moisture, carbon dioxide, etc. was adsorbed and removed in the room-temperature adsorption tower 7 to obtain 10,000 $Nm^3$/hr of pretreated air 1b.

The pretreated air was cooled to a primary treatment temperature of −60° C. in heat exchanger 12 and adsorption treated at this temperature in tower 9. The primary treated air was then cooled to a secondary treatment of −150° C. by heat exchanger 13 and adsorption treated at this temperature in tower 10. Secondary treated air 1d was obtained at the rate of 10,000 $Nm^3$/hr, at a pressure of 1.9 $kg/cm^2$ G and a temperature of −149° C.

Of the secondary treated air 1d, 7550 $Nm^3$/hr was passed through the cooling source heat exchanger 15 and made available as super clean air 1e. The remaining part 1'd (2450 $Nm^3$/hr) of the air 1d was expanded to 0.15 $kg/cm^2$ G in expansion turbine 18 so that it was cooled to −168° C., before being applied to the cooling source heat exchanger 15 to cool the super clean air 1e. The air 1e was passed through heat exchangers 13 and 12 to lower the temperature of the pretreated air 1b to the primary treatment temperature and lower the temperature of the primary treated air 1c to the secondary treatment temperature.

The 2450 $Nm^3$/hr of air 1'd, after being heat exchanged in heat exchanger 15, was passed through heat exchangers 13 and 12 and supplied to the one of the room-temperature adsorption towers 7 not engaged in adsorption. This part of air 1'd was used to regenerate the adsorbent and cool the tower 7.

Liquefied nitrogen 17a was used to regenerate and cool the one of towers 9 and the one of towers 10 not currently engaged in the adsorption process.

Analyzers 28 and 29, identical to the analyzers described above, were connected to sense the air 1e at the output of the low-temperature adsorption treatment apparatus 3. The analysis yielded essentially the same results as set forth in Table I. That is, the concentration of chemical components other than nitrogen, oxygen and noble gases in air 1e was below the detection limit (1 ppb) of the chemical component analyzer and the dew point was −110° C.

What is claimed is:
1. A method of producing super clean air from atmospheric air containing chemical components in addition to nitrogen, oxygen, and noble gases, said method comprising pre-treating the atmospheric air to remove carbon dioxide and moisture, treating the atmospheric air with an adsorbent at a treatment temperature in the range of from −40° C. to −180° C. to adsorb and remove the additional chemical components, other than nitrogen, oxygen, and noble gases, from the atmospheric air, to obtain super clean air, wherein said chemical components are present in a plurality of chemical component groups, each group including chemical components having respective solidification temperatures close to each other and falling within a solidification temperature range for the group, the adsorption treatment step being divided into a number of adsorption steps equal to the number of chemical component groups, the treatment temperature range for the group so that, by starting with an adsorption step having a highest treatment temperature and carrying out the adsorption steps at successively lower treatment temperatures until the treatment step having the lowest treatment temperature has been completed, the chemical components are adsorbed as a gas and removed group by group starting with a group having a highest solidification temperature range and ending with a group having a lowest solidification temperature range.

2. A method as claimed in claim 1, wherein said step of treating the atmospheric air with an adsorbent is carried out under pressure, and wherein the super clean air is expanded and used to cool the atmospheric air.

3. A method as claimed in claim 1 wherein the adsorbent has the property of adsorbing nitrogen in greater amounts, as compared to oxygen, at temperatures in the range of −40° C. to −180° C.

4. A method of producing super clean air from atmospheric air, said method comprising pre-treating the atmospheric air to remove carbon dioxide and moisture, and adsorbing and removing chemical components other than nitrogen, oxygen, and noble gases from the atmospheric air by treating the atmospheric air with an adsorbent in at least first and second sequential adsorption steps at treatment temperatures in the range of −40° C. to −180° C., provided that the treatment temperature is close to but at least slightly higher than the solidification temperature of chemical components to be removed so that the chemical components are adsorbed as a gas, to obtain super clean air having a dew point of from −40° C. to −120° C., wherein the treatment temperature in said second step is lower than the treatment temperature in said first step.

5. A method as claimed in claim 6, wherein the step of treating the atmospheric air is carried out under pressure, and wherein said super clean air is expanded and used to cool atmospheric air.

6. A method as claimed in claim 4 wherein the super clean air is cooled by indirect heat exchange with liquefied nitrogen from an external source, the super clean air then being mixed with heat exchanged nitrogen and used to cool the atmospheric air.

7. A method as claimed in claim 4 wherein said step of pre-treating comprises adsorption treating the atmospheric air with an adsorbent at room temperature to remove $H_2O$ and $CO_2$.

8. A method as claimed in claim 4 wherein synthetic zeolite is an adsorbent used to pre-treat the atmospheric material air at room temperature.

9. A method as claimed in claim 8 wherein the synthetic zeolite is mixed with activated alumina.

10. A method as claimed in claim 7 wherein, prior to the step of pre-treating, the atmospheric air is subjected to oxidization treatment by a noble metal catalyst at a temperature in the range of 130° C. to 150° C. to change any $H_2$, CO and $CH_4$ present in the atmospheric air to $H_2O$ and $CO_2$, the atmospheric air then being cooled to room temperature prior to the step of pretreating.

11. A method as claimed in claim 7 wherein a portion of the super clean air is used as a regeneration and cooling gas for regenerating and cooling the adsorbent used for the step of pre-treating.

12. A method as claimed in claim 4 wherein, in said step of pre-treating, the atmospheric air is pressurized and then cooled to remove moisture.

13. A method as claimed in claim 4 wherein the chemical components are present in a plurality of chemical component groups, each group including chemical components having respective solidification temperatures close to each other and falling within a solidification temperature range for the group, the low-temperature adsorption treating being divided into a number of adsorption steps equal to the number of chemical component groups, the treatment temperature for each group being close to but slightly higher than an upper limit of the solidification temperature range for the group so that, by starting with an adsorption step having a highest treatment temperature and carrying out the adsorption steps at successively lower treatment temperatures until the treatment step having the lowest treatment temperature has been completed, the chemical components are adsorbed and removed group by group starting with a group having a highest solidification temperature range and ending with a group having a lowest solidification temperature range.

14. A method of producing super clean air from atmospheric air, said method comprising adsorbing and removing chemical components other than nitrogen, oxygen and noble gases from the atmospheric air by low-temperature adsorption treating the atmospheric air with adsorbents at a treatment temperature in the range of −40° C. to −180° C., provided that the treatment temperature is close to but at least slightly higher than the solidification temperature of chemical components to be removed so that the chemical components are adsorbed as a gas, to obtain super clean air having a dew point of −100° C. or lower and a concentration of chemical components, other than nitrogen, oxygen and noble gases, of less than one part per billion.

15. A method as claimed in claim 14 wherein the chemical components are present in a plurality of chemical component groups, each group including chemical components having respective solidification temperatures close to each other and falling within a solidification temperature range for the group, the low-temperature adsorption treating being divided into a number of adsorption steps equal to the number of chemical component groups, the treatment temperature for each group being close to but slightly higher than an upper limit of the solidification temperature range for the group so that, by starting with an adsorption step having a highest treatment temperature and carrying out the adsorption steps at successively lower treatment temperatures until the treatment step having the lowest treatment temperature has been completed, the chemical components are adsorbed and removed group by group starting with a group having a highest solidification temperature range and ending with a group having a lowest solidification temperature range.

16. A method as claimed in claim 15 wherein the super clean air is cooled by indirect heat exchange with liquefied nitrogen from an external source, the super clean air then being mixed with heat exchanged nitrogen and used to cool the atmospheric air.

17. A method as claimed in claim 16 wherein the step of low-temperature treating is carried out under pressure and the super clean air is expanded and used to cool the atmospheric air to the treatment temperatures.

* * * * *